(12) United States Patent
Ludtke

(10) Patent No.: US 6,675,240 B1
(45) Date of Patent: Jan. 6, 2004

(54) METHOD OF PROVIDING AND ENABLING A DYNAMIC AND SCALEABLE SYSTEM ARCHITECTURE FOR A COMPUTER SYSTEM

(75) Inventor: Harold Aaron Ludtke, San Jose, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 112 days.

(21) Appl. No.: 09/608,037

(22) Filed: Jun. 30, 2000

(51) Int. Cl.[7] .............................................. G06F 13/14
(52) U.S. Cl. ........................... 710/62; 710/8; 710/101; 370/463; 345/112
(58) Field of Search ............................. 710/8, 62, 101; 370/463; 345/112

(56) References Cited

U.S. PATENT DOCUMENTS

| | | | | |
|---|---|---|---|---|
| 5,819,107 A | | 10/1998 | Lichtman et al. ............ | 395/828 |
| 5,826,043 A | * | 10/1998 | Smith et al. ................. | 710/101 |
| 5,892,683 A | * | 4/1999 | Sung .......................... | 364/488 |
| 5,917,468 A | * | 6/1999 | Han ........................... | 345/112 |
| 6,061,362 A | * | 5/2000 | Muller et al. ................ | 370/463 |
| 6,189,050 B1 | * | 2/2001 | Sakarda ........................ | 710/18 |
| 6,189,056 B1 | * | 2/2001 | Ogura et al. .................. | 710/62 |
| 6,272,560 B1 | * | 8/2001 | Kenton et al. ................. | 710/8 |
| 6,357,003 B1 | * | 3/2002 | Zarrin et al. .................. | 713/2 |
| 6,366,876 B1 | * | 4/2002 | Looney ........................ | 703/25 |

* cited by examiner

Primary Examiner—Abdelmoniem Elamin
(74) Attorney, Agent, or Firm—Wagner, Murabito & Hao LLP

(57) ABSTRACT

A method of providing and enabling a dynamic and scaleable system architecture for a computer system is disclosed. The method is executed on a computer system having a processor, a computer readable memory, and an adapter for receiving a module that will add functionality to the computer system. The processor is coupled to the computer readable memory and to the adapter. The method is implemented on the computer system by storing program instructions on memory and executing them via the processor in conjunction with other components of the computer system. The method comprises several steps, starting with a first step of detecting the availability of a new function. Next, an input interface specification and an output interface specification for the new function is received by the computer system. In the next step, it is determined whether a first available function has an output interface specification that is compatible with the input interface specification for the new function, and whether a second available function has an input interface specification that is compatible with the output interface specification for the new function. The new function is then selectively enabled if the interface specifications are compatible.

18 Claims, 8 Drawing Sheets

320

400a

| INPUT INTERFACE SPEC. (IIS) 401 | FUNCTION (Fx) 402 | OUTPUT INTERFACE SPEC. (OIS) 403 |
|---|---|---|

FIGURE 4A

METHOD OF PROVIDING AND ENABLING A DYNAMIC AND SCALEABLE SYSTEM ARCHITECTURE FOR A COMPUTER SYSTEM

TECHNICAL FIELD

The field of the present invention pertains to the system architecture of a computer system. More particularly, the present invention relates to the field of providing and enabling a system architecture that is dynamic and scaleable.

BACKGROUND ART

Conventional electronic devices, such as Personal Computers (PCs), Personal Digital Assistants (PDAs) and other electronic devices, have the capability of performing multiple functions. These multiple functions can include signal processing, digital filtering, or running multiple application programs to provide video, audio, or other data output. However, conventional electronic devices have severe limitations in operating and instantiating functionality in the system architecture. Consequently, a need arises for a method and apparatus to overcome the limitations of the conventional methods used in the conventional electronic devices.

Referring to prior art FIG. 1, a block diagram of a conventional expansion card adding functionality to a conventional personal computer is shown. Diagram 100 shows a functional expansion card 104 providing a predetermined and static function 106 as input to the PC 102. For example, expansion card 104 can be a Sound Blaster™ card that adds functionality to a PC sound system with digital filtering, digital sound effects, etc.

The sound card typically provides a combination of hardware and software to accomplish new functions, e.g., stereo sound with echo effect, that complement or replace functions available on the host computer. Unfortunately, a sound card may not operate on every system. Thus for example, a conventional PC may have existing functions, e.g., in hardware and software, that do not provide the appropriate data to the new expansion card. Similarly, the conventional PC may not have suitable functions to accept the data provided by the sound card. This is why a conventional expansion card is typically programmed for, and listed as operating on, only predetermined systems with rigidly defined functions. If the system accepting the expansion card has a minor deviation from the aforementioned functional requirements, then the expansion card may result in system conflicts and ultimately, the inability to operate the computer system. With these rigid and inflexible paradigms, conventional methods and apparatus for expanding the functionality of a computer can be a frustrating and counterproductive experience. Thus a need arises for a method of accommodating changes in functionality to a computer system that overcome the limitations of the predetermined system requirements and the failure modes associated with conventional functional expansion cards.

Besides the limitations of predetermined systems and potential conflicts, a conventional expansion card also has installation limitations. That is, a conventional expansion card is not suitable for dynamic installation and operation in the PC or for dynamically removal from, and continued operation of, the PC. In particular, the expansion card cannot be installed and uninstalled "hot", e.g., while the PC is operating. Rather, the PC is typically shut down, the card installed, the software installed for the appropriate drivers and instructions, the PC rebooted, and only then the expansion card is operable. Naturally, this conventional methodology is inconvenient in terms of time and effort. Consequently, a need arises for an apparatus and method that overcomes the installation limitations of the conventional expansion card.

SUMMARY OF THE INVENTION

The present invention provides a method and apparatus for providing and enabling a computer system architecture that is dynamic and scaleable. By doing so, the present invention overcomes the limitations of the conventional rigid and static system architectures in the conventional electronic devices. The present invention also overcomes the limitations of the predetermined system requirements and the failure modes associated with conventional functional expansion cards. Finally, the present invention overcomes the installation limitations of the conventional expansion card.

In one embodiment of the present invention provides a computer system having a processor, a computer readable memory, and an adapter for receiving a module that will add functionality to the computer system. The processor is coupled to the computer readable memory and to the adapter. A method of providing a dynamic and scaleable system architecture is implemented on the computer system by storing program instructions on memory and executing them via the processor in conjunction with other components of the computer system. The method comprises several steps, starting with a first step of detecting the availability of a new function. Next, an input interface specification and an output interface specification for the new function is received by the computer system. In the next step, it is determined whether a first available function has an output interface specification that is compatible with the input interface specification for the new function, and whether a second available function has an input interface specification that is compatible with the output interface specification for the new function. The new function is then selectively enabled if the interface specifications are compatible.

As an example, a new module having a processor and a memory, coupled to each other, is dynamically installed into an adapter portion of a computer system, e.g., while the computer system is operating. The new module has program code and processor capabilities to perform high-level audio processing including functions such as surround sound and echo effects. These new functions can replace the existing low-level audio processing functions that may have previously existed on the computer system. The new module also has input and output interface specifications which supply the type and format of data that can be input and output from the function. A dynamic architecture engine, existing as code in memory of the computer system and executed on the processor of the computer system, receives the input and output interface specifications from the new module, and determines if existing functions on the computer system have complementary inputs and output interface specifications.

In this example, the input and output interface specifications from the new module satiate industry standard formats, and are compatible with the other audio functions provided by the computer system. Consequently, the new module can be dynamically instantiated while the system is running with seamless performance to the user. A complementary example arises when the new module is dynamically removed from the computer system. Thus, the present invention provides a scaleable architecture for the computer system by providing more or less functions that can be implemented in a dynamic fashion.

These and other advantages of the present invention will become clear to those of ordinary skill in the art after having read the following detailed description of the preferred embodiments which are described herein.

BRIEF DESCRIPTION OF THE DRAWINGS

The accompanying drawings, which are incorporated in, and form a part of, this specification, illustrate embodiments of the invention and, together with the description, serve to explain the principles of the invention. The drawings referred to in this description should be understood as not being drawn to scale except if specifically noted.

PRIOR ART

FIG. 4A is a functional block diagram of a general function with an input interface specification and an output interface specification, in accordance with one embodiment of the present invention.

BEST MODE FOR CARRYING OUT THE INVENTION

Figure 1:
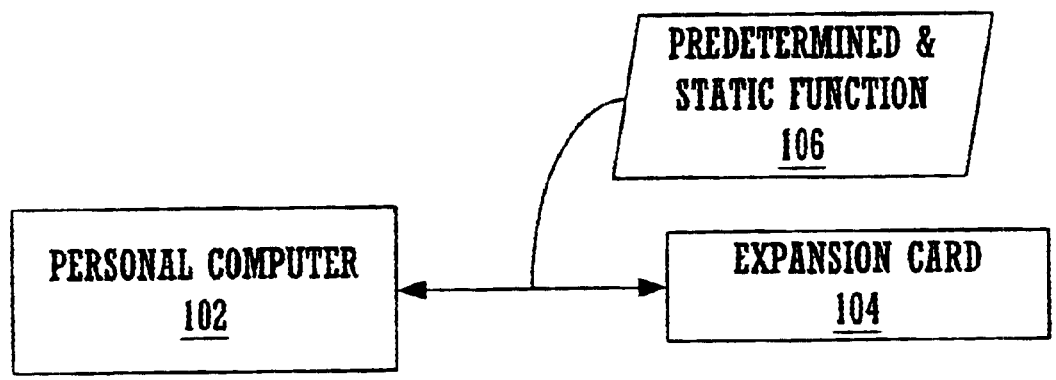
FIG. 1 is a block diagram of a conventional expansion card adding functionality to a conventional personal computer.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g. the processes, are presented in terms of procedures, logic blocks, processing, and other symbolic representations of operations on data bits within a computer or a digital system memory. These descriptions and representations are the means used by those skilled in the arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "detecting," "receiving," "determining," "enabling," "instantiating," "providing," identifying," "linking," or the like, refer to the action and processes that can be implemented by an electronic computing device, that manipulates and transforms data. The data is represented as physical (electronic) quantities within the registers and memories of the device, and is transformed into other data similarly represented as physical quantities within the device components, or computer system memories or registers, or other such information storage, transmission or display devices.

Figure 2:
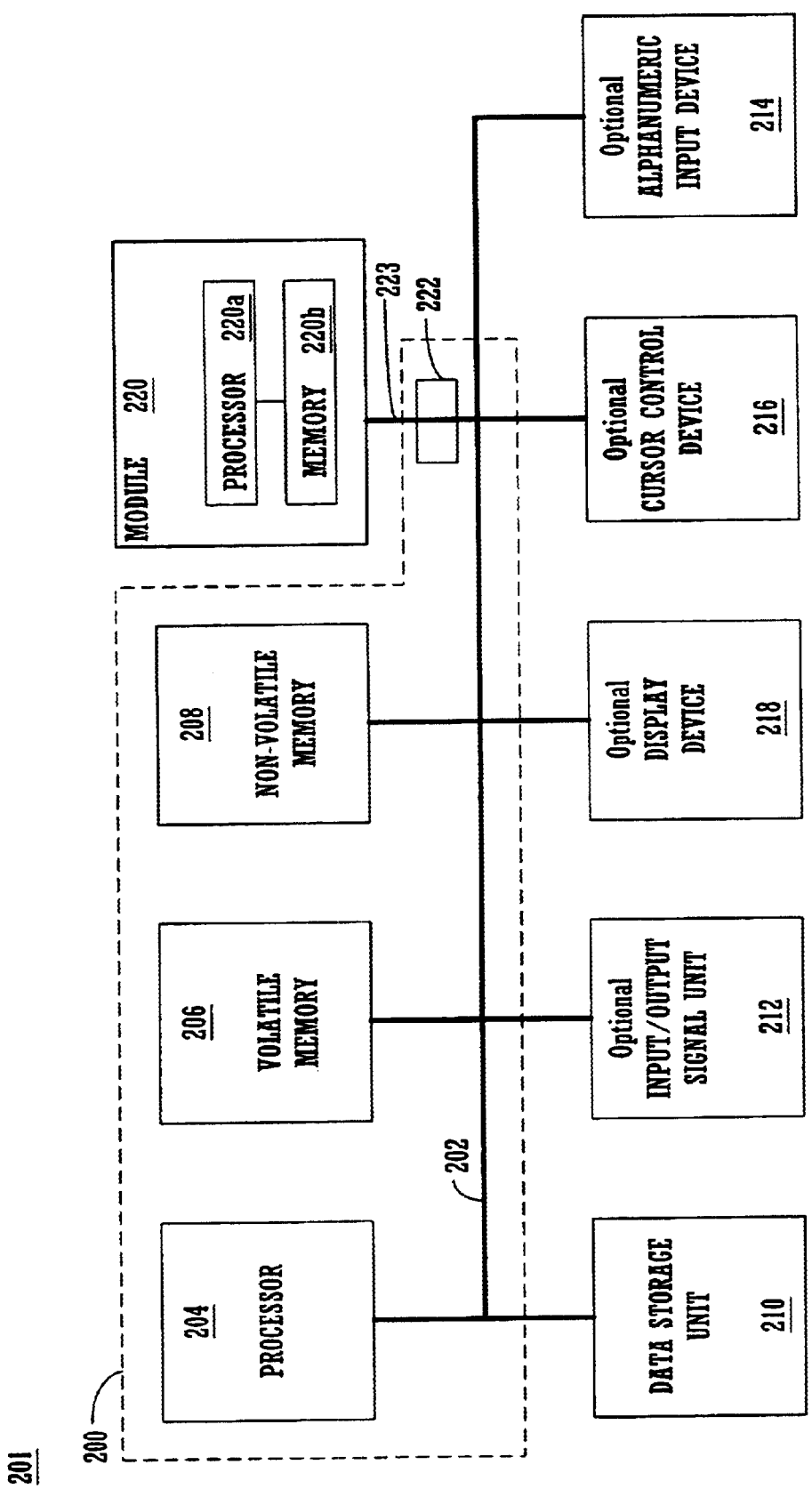
FIG. 2 is a hardware block diagram of a computer system for providing and enabling a dynamic and scaleable system architecture, in accordance with one embodiment of the present invention.

Referring now to FIG. 2, a hardware block diagram of a computer system for providing and enabling a dynamic and scaleable system architecture is shown, in accordance with one embodiment of the present invention. In particular, a processor and a memory, along with other components of computer system 201, are used in the present embodiment to implement a function linking engine which enables a process for providing a dynamic and scaleable system architecture. The engine and process are described in subsequent figures.

System 201 includes an electronic device 200, e.g. a nominal computer platform, coupled together with additional optional components that bring additional functionality to create computer system 201. Electronic device 201 includes an address/data-bus 202 for communicating information, and includes a central processor unit 204 coupled to bus 202 for processing information and instructions. Electronic device 201 includes data storage features such as a computer usable volatile memory 206, e.g. random access memory (RAM), coupled to bus 202 for storing information and instructions for central processor unit 204, and computer usable non-volatile memory 208, e.g. read only memory (ROM), coupled to bus 202 for storing static information and instructions for central processor unit 204. Finally, electronic device 201 includes an adapter 222 for receiving additional processing components, e.g. module 220.

System 201 of FIG. 2 also includes an optional data storage unit 210 (e.g., a magnetic or optical disk and disk and a disk drive) coupled to bus 202 for storing information and instructions. An optional input output signal unit 212

(e.g. a modem or network interface card (NIC)) coupled to bus 202 is also included in system 201 of FIG. 2 to communicate with peripheral devices. System 201 of the present invention also includes an optional alphanumeric input device 214 including alphanumeric and function keys, coupled to bus 202 for communicating information and command selections to central processor unit 204. System 201 also optionally includes a cursor control device 216 coupled to bus 202 for communicating user input information and command selections to central processor unit 204. Lastly, system 201 of the present embodiment includes an optional display device 218 coupled to bus 202 for displaying information.

System 201 also includes a module 220. Module 220 is used in the present embodiment to add functionality, such as software and hardware for advanced audio processing functions, to electronic device 200. Module 220 can be any of a number of proprietary configurations of interface cards, typically having a processor 220a and memory 220b, coupled to each other. Memory 220b can be RAM or ROM configuration. Module 220 is linked to adapter 222 of electronic device by a bus 223, which is compatible with the bus 202 of host electronic device 200. One such example is the SONY Info Stick™, which can be configured to perform a wide variety of functions, such as audio enhancement, wireless communication, etc. The instructions and data for providing the dynamic and scaleable system architecture on the electronic device can either be provided via memory 220b of module 220, or via memory 206, 208 of host electronic device 200. While the present embodiment uses only an adapter 222 and a single module 220, the present invention is well-suited to using any number of adapters to accommodate any number of modules in computer system 201. Furthermore, module 220 can have any one of a number of configurations of different processor and/or memory configurations. For example, a module can have a digital signal processor (DSP) for audio/video processing or a general purpose processor for other types of processing.

Optional display device 218 of FIG. 2 may be a liquid crystal device, cathode ray tube, or other display device suitable for creating graphic images and alphanumeric characters recognizable to a user. Optional display device can also act as an input device if configured as a touch sensitive screen to accept information from a graphical user interface (GUI). Optional cursor control device 216 allows the computer user to signal the two dimensional movement of a visible symbol (cursor) on a display screen of display device 218. Many implementations of cursor control device 216 are know in the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well suited to directing a cursor by other means such as, for example, voice commands.

Bus 202 of FIG. 2 provides an exemplary coupling configuration of devices in system 201. Bus 202 is shown as a single bus line for clarity. It is appreciated by those skilled in the art that bus 202 can include subcomponents of specific data lines and/or control lines for the communication of commands and data between appropriate devices. It is further appreciated by those skilled in the art that bus 202 can be a parallel configuration or a serial configuration and that bus 202 can include numerous gateways, interconnects, and translators, as appropriate for a given application.

It is appreciated that computer system 201 is exemplary only and that the present invention can operate within a number of different computer systems including general purpose computer systems, embedded computer systems, and stand alone computer systems specially adapted for network operation. Furthermore, the present invention is well-suited to using a host of intelligent devices that have similar components as computer system 201.

Figure 3A:
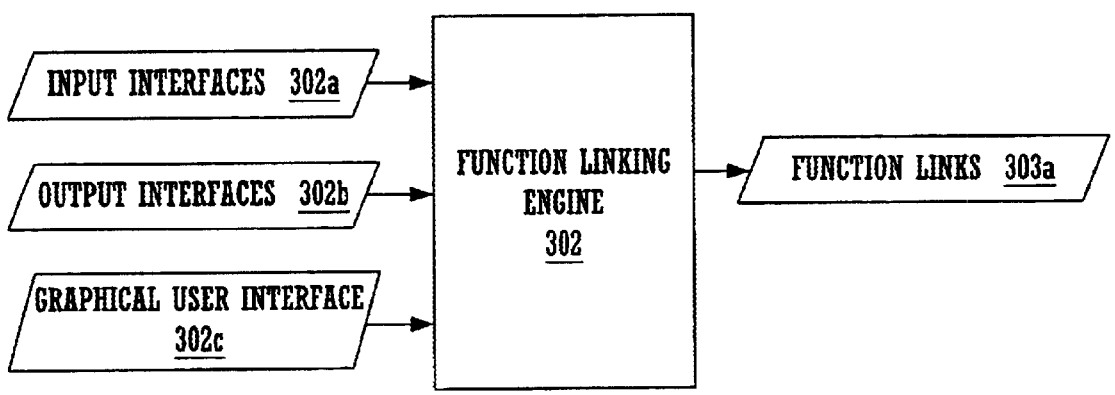
FIG. 3A is a function block diagram of a function-linking engine that enables a dynamic and scaleable system architecture, in accordance with one embodiment of the present invention.

Referring now to FIG. 3A, a function block diagram of a function-linking engine that enables a dynamic and scaleable system architecture is shown, in accordance with one embodiment of the present invention. Functional block diagram 300 is intended to provide an exemplary visual model of the inputs and outputs for function-linking engine 302 that enables the process of providing the dynamic and scaleable system architecture. Function-linking engine 302 can be implemented using the hardware, such as the memory and processors, provided in FIG. 2.

Inputs to function-linking engine 302 include input interfaces 302a, output interfaces 302b, and graphical user interface (GUI) input 302c. Outputs from function-linking engine 302 include functional links 303a. Interface specifications are described in the subsequent FIG. 3B. Input interfaces 302a of FIG. 3A include input interface specifications for existing functions that are currently implemented in a computer system, and input interface specifications for new functions that are scheduled to be implemented on the computer system. Similarly, output interfaces 302b include output interface specifications for existing functions that are currently implemented in a computer system, and output interface specifications for new functions that are scheduled to be implemented on the computer system. Lastly, GUI input 302c can provide default preferences or user preferences as may be appropriate for a given application.

Function linking engine 302 provides an output of function links 303a in the present embodiment. Function links 303a is an output that provides the management for the dynamic and scaleable architecture by indicating what functions can be linked to what other functions. In particular, the function links will indicate that one function can provide an output that will be received as an input at another discrete function, and so forth.

While the present embodiment provides specific types of interface specifications, the present invention is well suited to providing additional types interface specifications, such as those for ceased functions, which can be maintained for archiving purpose. Similarly, the present invention is well suited to receiving additional inputs to function linking engine 302 that will provide criteria by which functions may be linked in a dynamic and scaleable system architecture. For example, specific performance criteria for a given function can be included as an input to function linking engine 302. Lastly, the present invention is well suited to providing additional outputs, beyond function links 303a, that will enable a more useful system architecture.

Figure 3B:
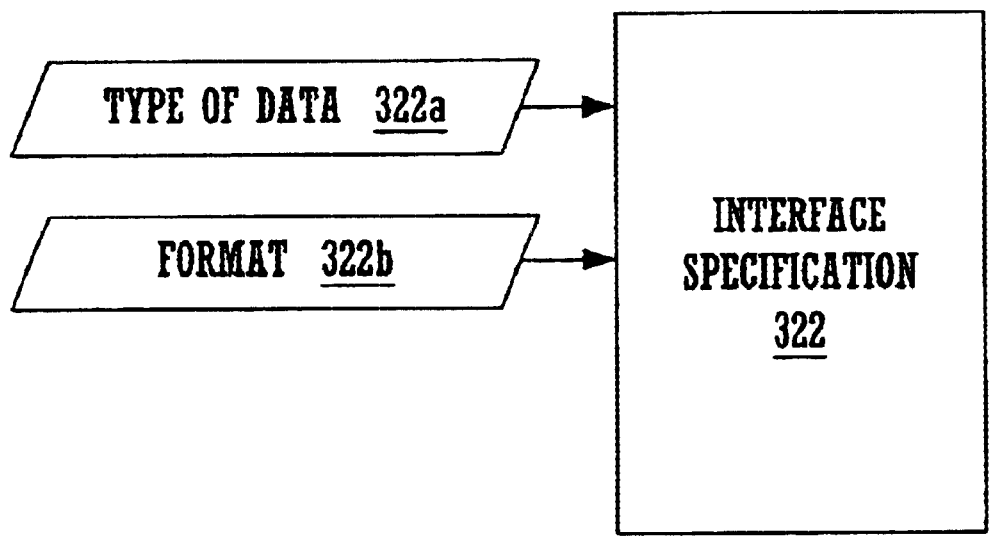
FIG. 3B is a block diagram of the inputs that define an interface specification, in accordance with one embodiment of the present invention.

Referring now to FIG. 3B, a block diagram of the inputs that define an interface specification is shown, in accordance with one embodiment of the present invention. FIG. 3B shows an interface specification block 322 that has two inputs. A first input is the type of data 322a, while a second input is the format of data 322b. Type of data 322a can refer to classical data categories such as audio data, visual data, control data, etc. By providing a category of data in an interface specification, a function linking engine will intelligently provide a functional link between appropriate functions, e.g., a functional link may not be appropriate for a function that processes only visual signals and a function that processes only audio signals. Similarly, format of data 322b can refer to classical data formats, such as Institute of Electrical and Electronic Engineers (IEEE) standard formats, Joint Photographic Expert Group (JPEG) visual formats, data transfer protocols, data packing protocols, etc. that are suitable for a given system or application.

By providing a format of data in an interface specification, a function linking engine will be able to match functions according to appropriate formats, e.g., linking a function that provides an audio version 5.1 signal format to another function that can accept an audio version 5.1 signal format for subsequent processing. In an alternative embodiment, interface specification 322 can provide information regarding multiple levels of performance offered by a function. For example, a function may provide code for 4-bit level of data processing and an 8-bit level of data processing. However, the higher level of performance for a given function may consume additional resources. Different systems may have varying amounts of available resources that may or may not allow them to take advantage of the higher performance levels.

Referring now to FIG. 4A, a functional block diagram of a general function with an input interface specification and an output interface specification is shown, in accordance with one embodiment of the present invention. Block diagram 400a shows input interface specification (IIS) 401 and Output Interface Specification (OIS) 403 spatially located at the front end and back end, respectively, of function (Fx) block 402 for illustrative purposes. The interface specifications can be located anywhere in the function software code, or in any memory location that can be suitably tied to the function code.

More specifically, the interface specifications can be implemented using a descriptive language, such as Extensible Markup Language (XML), in one embodiment. The interface specifications, or definitions, can be provided in the cantaloupe structure, and utilize XML to describe not only data format interfaces, but real time operational interfaces as well. A more thorough discussion of real time operation and interfaces is provided in co-pending U.S. patent application Ser. No. 09/584,761 entitled "A Method Of Guaranteeing Bandwidth For Media Processing Of Isochronous Tasks On An Electronic Device Utilizing Multiple Processing Components" by Harold Aaron Ludtke. This related application is commonly assigned, and is hereby incorporated by reference. Utilizing a descriptive language, such as XML, also enables the function linking engine to search for, and match up, the best components and candidates to achieve the best final outcome, e.g., in cases where multiple components are available to be linked together.

In another embodiment interface specifications for a function can be described in data referred to as a "cantaloupe." A cantaloupe can be stored in the memory of a module or in a computer system. Co-pending U.S. patent application Ser. No. 09/521,334 now U.S. Pat. No. 6,453,376, entitled "Method For Implementing Scheduling Mechanisms With Delectable Resource Modes" by Bruce A. Fairman et al., provides additional detail on the subject of the cantaloupe. This related application is commonly assigned, and is hereby incorporated by reference.

Figure 4B:
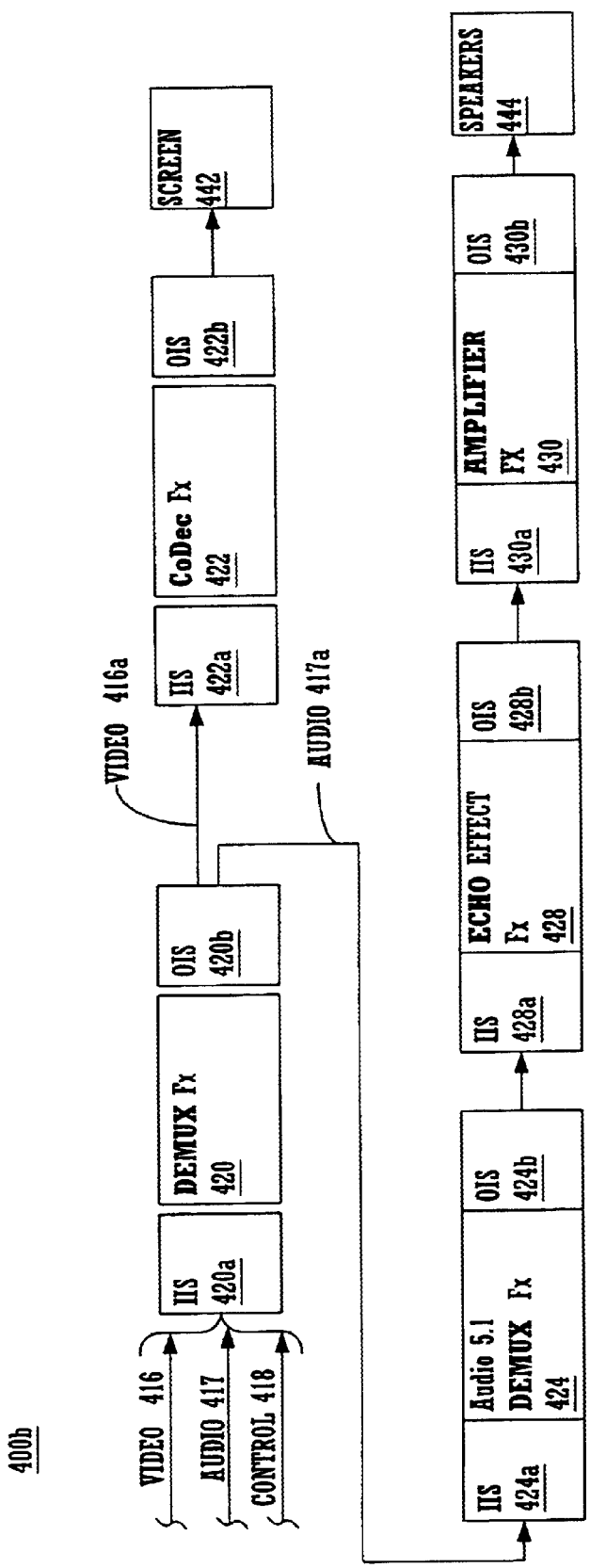
FIG. 4B is a functional block diagram of an exemplary system architecture for a computer system having multiple functions, in accordance with one embodiment of the present invention.

Referring now to FIG. 4B, a functional block diagram of an exemplary system architecture for a computer system having multiple functions is shown, in accordance with one embodiment of the present invention. Functional block diagram 400b provides an example of how the present invention can provide a dynamic and scaleable system architecture. Specifically, functional block diagram 400b provides functions that process a multiplexed input data signal to the final user medium of a video screen 442 and audio speakers 444. The instantiation and cessation of specific functions within functional block diagram 400b will be described in a flowchart of a subsequent figure.

Each of the functional blocks in functional block diagram 400b will now be described along with its respective input interface specification and output interface specification. Multiplexed input signal contains video data 416, audio data 417, and control data 418. Demultiplex (Demux) function (Fx) 420 has an Input Interface Specification (IIS) 420a that indicates that it can receive multiplexed video, audio, and control data. Output Interface Specification (OIS) 420b for demux function 420 indicates that it provides video 416a and audio 417a types of data as output, in an IEEE format for example. The demuxed video signal 416a is fed to the Coder Decoder (CoDec) function block 422, whose IIS 422a indicates that it accepts video type of data in an IEEE format, and whose OIS 422b indicates its output as a row pixel intensity signal appropriate for a matrix display screen. If screen 442 is identified as a matrix display device, then the CoDec function block 422 is appropriate. Alternatively, another CoDec function block 422, not shown, may provide an analog output signal for a Cathode Ray Tube (CRT) type of display device.

Demuxed audio data signal 417a is supplied to an audio Version 5.1 Demux function 424 that can separate the multiple audio channels of the input signal. Audio 5.1 Demux function has an IIS 424a that indicates it accepts an audio type of signal in a format of either Dolby Digital, THX, or ProLogic, in the present embodiment. Audio 5.1 Demux function 424 has an OIS 424b that specifies an output of an audio signal in a format that includes multiple signals, e.g., one distinct signal for each channel in a version 5.1 format. Echo effect function 428 has an IIS 428a that indicates it can accept either an audio type of signal in a version 5.1 format with a specific quantity, or range, of channels, and it has an OIS 428b indicating that it is providing an audio type of signal, in a version 5.1 format with echo effect format. In one embodiment, the functions of prior functions can be cumulatively carried through subsequent functions to retain the full functionality performed on the data signal. While FIG. 4B provides exemplary types of data and formats for the functions, the present invention is well suited to using any type of function, any type of data, and any type of format, as appropriate for a given system or application.

Figure 5A:
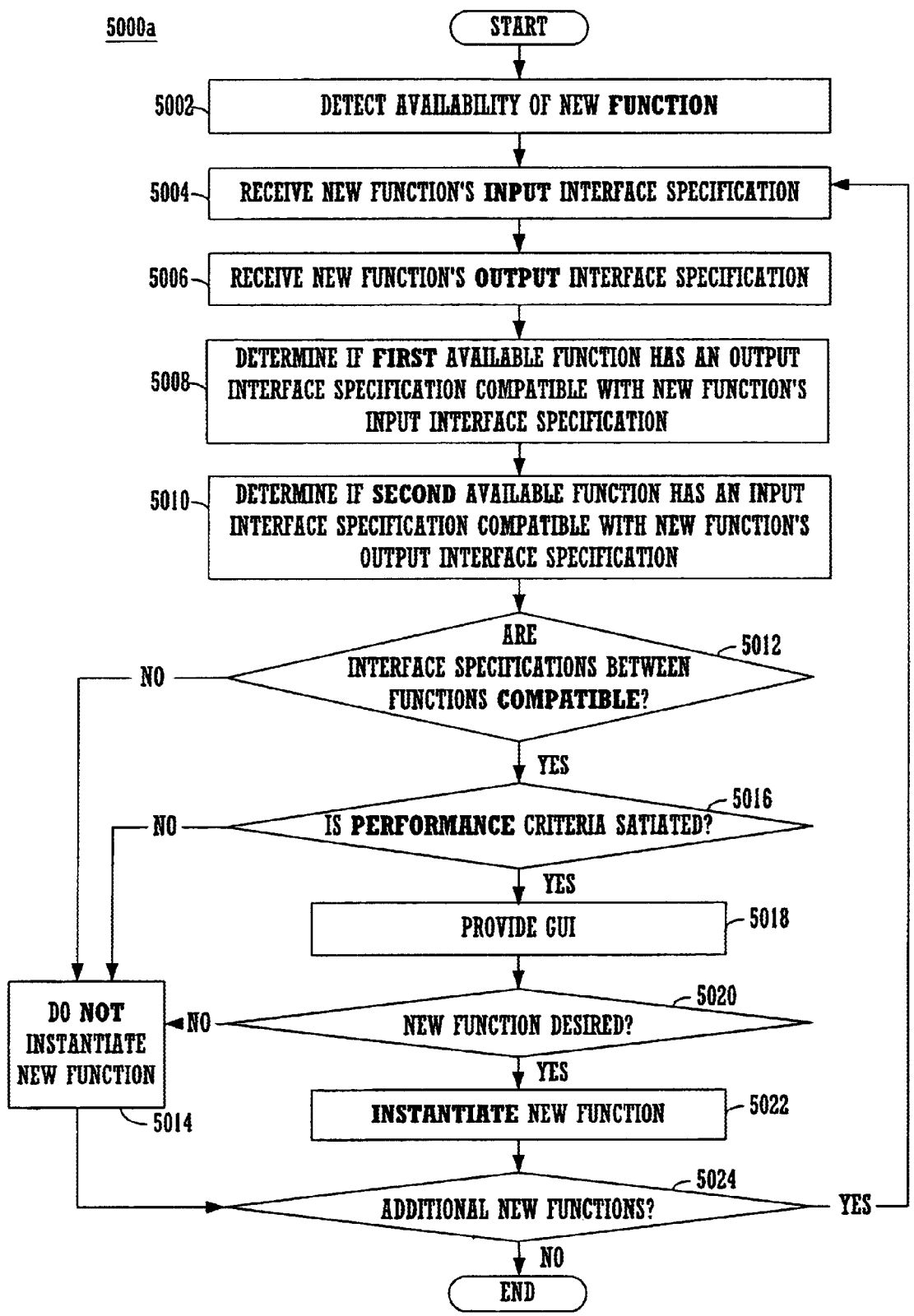
FIG. 5A is a flowchart of a process to dynamically instantiate a function in a scaleable system architecture, in accordance with one embodiment of the present invention.

Referring now to FIG. 5A, a flowchart of a process to dynamically instantiate a function in a scaleable system architecture is shown, in accordance with one embodiment of the present invention. By using the flowchart 5000a embodiment, the present invention provides flexibility to automatically and dynamically accommodate different device configurations, different module capabilities, and different functions in a seamless manner. Flowchart 5000a is implemented using the hardware described in FIG. 2A and the functional blocks of FIGS. 3A and 3B. However, the present invention is well suited to using any electronic device having a suitable processor and memory for accepting the instructions and data for performing the process. In one embodiment, flowchart 5000a accommodates the dynamic installation of a module into an operating computer system. By doing so, the present invention provides a method for dynamically implementing the new function of the module in harmony with the existing functions operating on the host computer system.

Flowchart 5000a begins with step 5002. In step 5002 of the present embodiment, the availability of a new function is detected. Step 5002 is implemented, in one embodiment, by computer system 201 detecting the insertion of a module 220 which has new functionality. The process of detecting a new module can be a signal initiated by the module and received by the processor of the host device. That is, the installation of a module can automatically provide an interrupt or a notification to the host device that new processing and new functional capabilities are now available for the system.

As an example, a new module adding function, as detected by step 5002, can provide an echo effect audio function, which the host computer system does not have. However, the functionality added by a module can be any type of function. Alternatively, in lieu of receiving the new function by a physical insertion of a module, the new function can be a function that exists on the electronic device, but is only enabled by a third party, e.g., based on a business model. The enabling of the functionality remotely by a third party can be sensed by the electronic device and accommodated in the dynamic and scaleable system architecture as discussed in the following steps. Following step 5002, flowchart 5000a proceeds to step 5004.

In step 5004 of the present embodiment, the new function's input interface specification is received. The new function's input interface specification can include information indicated in FIG. 3B, including its alternative embodiments. In one embodiment, the new function's input interface specification can be provided by a cantaloupe portion of code. A more thorough discussion of a cantaloupe and the information it can provide is presented by Bruce A. Fairman et al., as discussed hereinabove. In another embodiment, the new function's input interface specification can be provided by a database of functions or a look up table that exists on the host computer system, or is provided by some source other than the module itself, e.g., by an Internet source. The input information for a function that is described by the input interface specification can be formatted in a descriptive language. In one embodiment, the descriptive language is an Extensible Markup Language (XML) language. However, the present invention is well suited to using other types of languages to provide the information. Following step 5004, flowchart 5000a proceeds to step 5006.

In step 5006 of the present embodiment, the new function's output interface specification is received. Step 5006 involves the same implementation and alternatives as step 5004, albeit for the complementary interface specification. Following step 5006, the flowchart 5000a proceeds to step 5008.

In step 5008 of the present embodiment, it is determined whether an output interface specification for a first available function is compatible with the new function's input interface specification. Step 5008 essentially determines whether a first set of functions can talk to each other. Thus, for a new function to be implemented it will receive as input data, the output from another function. Step 5008 essentially determines whether the upstream supply of data to the new function is compatible. As an example, if new module having echo effect functions 428 of FIG. 4B is dynamically installed into an operating system, then the function linking engine 302 of FIG. 3A, will search for a function with an output interface specification that can talk to the input interface specification of the echo effect function 428. And function linking engine 302 would find, in this example, that audio 5.1 demux function 424 would have an OIS 424b that is compatible with echo effect function IIS 428a. However, it is possible that more than one existing function is compatible with the new function. In this case, the function that is furthest downstream would be considered for implementation. This would provide the maximum amount of functionality for the computer system, as one embodiment. Alternatively, other factors such as quality or system resource consumption, as described in the cantaloupe in one embodiment, can be used to determine the linking of a function. As previously mentioned, the step of matching input and output interfaces could occur in a data base or lookup table application, or some other similar cross-referencing method. Following step 5008, flowchart 5000a proceeds to step 5010.

In step 5010 of the present embodiment, it is determined whether an input interface specification for a second available function is compatible with the new function's output interface specification. Step 5010 essentially determines whether a second set of functions can talk to each other. Thus, for a new function to be implemented it will produce output data, which will be received as input data for another function. Step 5010 essentially determines whether the downstream supply of data from the new function is compatible. As an example, if new module having echo effect functions 428 of FIG. 4B is dynamically installed into an operating system, then the function linking engine 302 of FIG. 3A, will search for a function with an input interface specification that can talk to the output interface specification of the echo effect function 428. And function linking engine 302 would find, in this example, that amplifier function 430 has an IIS 430a that is compatible with echo effect function OIS 428b. In the present embodiment, a new function will typically fit between two functions that previously communicated directly to each other. However, the present invention is well suited to implementing a new function that may bypass some previously exiting upstream or downstream functions because of incompatibility or because of improved system efficiency. The alternatives mentioned for step 5008 are also applicable to step 5010. Following step 5010, flowchart 5000a proceeds to step 5012.

In step 5012 of the present embodiment, an inquiry determines whether the interface specification between functions are compatible. Step 5012 basically provides the logic for testing steps 5008 and 5010 for all available functions in a given computer system. If the interface specifications between a new function and an existing upstream and downstream function are compatible, the flowchart 5000a proceeds to step 5016. However, if the interface specifications between a new function and an exiting upstream and downstream function are not compatible, the flowchart 5000a proceeds to step 5014. In lieu of checking both functions at once, one upstream can be checked first and then a downstream function can be checked second. Alternatively, flowchart 5000a can be implemented to provide more than one configuration of linking functions. Subsequent steps can provide input for choosing one of the multiple possible configurations.

Step 5014 arises if the interface specifications between a new function and an exiting upstream and downstream function are not compatible. In step 5014 of the present embodiment, the new function is not instantiated. Step 5014 assumes that all possible existing functions in a computer system 201 have been ascertained in step 5012. Following step 5014, flowchart 5000a proceeds to step 5024.

Step 5016 arises if the interface specifications between a new function and an exiting upstream and downstream function are compatible. Step 5016 can be implemented, in one embodiment, using the function linking engine 302 of FIG. 3A as further implemented by components of computer system 201 of FIG. 2. In particular, function linking engine 302 can provide the data transfer and control mechanisms that allow for the flow of data between the newly linked functions. Function linking engine 302 can also provide for the execution of the functions on the appropriate components, e.g., which of the possible multiple processors, of computer system 201.

In step 5016 of the present embodiment, an inquiry determines whether a performance criteria is satiated. If the performance criteria is satiated with the implementation of the new function, then flowchart proceeds to step 5018. However, if the performance criteria is not satiated with the implementation of the new function, then flowchart 5000a proceeds to step 5014, described hereinabove. The performance criteria utilized in step 5016 can be a default value, or it can be a value determined by a user input, or third party. If an interface specification provides information regarding multiple levels of performance offered by a function, then the performance check in step 5016 may dictate which level of performance is chosen, in one embodiment.

The performance criteria for step 5016 can be any benchmark data that provides the tradeoff for implementation of a new function. That is, while steps 5002 through 5012 determined whether a new function was compatible for operation within the existing functional architecture of a system, they did not examine the potential change in performance, speed, etc. of the system for accommodating the new compatible function. That is, the steps prior to step 5016 were concerned with whether the functions could "talk," e.g., communicate, to each other, and thus be implementable in the first place. Step 5016 now adds the performance criteria addressing whether the existing hardware and software performance can implement the functions that were identified as able to effectively talk with each other.

Performance criteria for step 5016 can be any performance that will affect the quality of data delivery to the user, power consumption, or some other factor appropriate for a given application. One such performance criteria is whether the functions can be performed in an isochronous manner. A more thorough discussion of performance criteria for scheduling tasks for the function, is provided in co-pending U.S. patent application Ser. No. 09/584,761, described hereinabove.

Yet another performance criteria may be whether data transfer can occur in a reasonable schedule. A more thorough discussion of performance criteria for scheduling tasks of a function, according to data transfer timing, is provided in co-pending U.S. patent application Ser. No. 09/607,612, entitled "A Method For Dynamically Synchronizing Data Transfer Between Simultaneous Tasks On An Electronic Device" by Harold Aaron Ludtke. This related application is commonly assigned, and is hereby incorporated by reference.

Step 5018 arises if the performance criteria is satiated, considering the implementation of the new function on the computer system. In step 5018 of the present embodiment, a graphical user interface (GUI) is provided. Step 5018 may be implemented using optional display device 218 to provide a user with the status of the implementation of the new function. For example, a GUI can indicate that the new echo effect function provide by the added module will slow down system performance such that the echo effect could not be performed in an isochronous manner, and that other existing system functions may also be slowed down. In this manner, the user has some input as to the desirability of the function and the ultimate management decision of the overall system. In lieu of providing a GUI and receiving user input, flowchart 5000a can simply make the decision whether to instantiate the new function based solely on a performance criteria, e.g., per step 5016. Alternatively, flowchart 5000a can simply instantiate the new function based solely on the availability of compatible functions, per step 5012. Following step 5018, flowchart 5000a proceeds to step 5020.

In step 5020 of the present embodiment, an inquiry determines whether the new function is desired. Step 5020 essentially responds to the input of the GUI. For example, a user may decide to not implement the function based on their personal preference or based on the performance slowdown caused by the new function on the system, as indicated in the GUI of step 5018. If the new function is not desired, the flowchart 5000a proceeds to step 5014. However, if the new function is desired, flowchart 5000a proceeds to step 5022.

In step 5022 of the present embodiment, the new function is instantiated. Instantiation refers to making the function fully operable on the computer system. This step is performed dynamically, in the present embodiment. Thus the new function is seamlessly integrated into the computer system, providing the scaleable system architecture. Following step 5022, flowchart 5000a proceeds to step 5024.

In step 5024 of the present embodiment, an inquiry determines if any additional new functions exist. If an additional new function does exist, then flowchart 5000a returns to step 5004. Alternatively, if a new function does not exist, then flowchart 5000a ends.

In view of the steps provided by flowchart 5000a, the present invention provides a dynamic and scaleable architecture that can expand to accommodate a new function. This provides compatibly with many diversified electronic devices, flexibility to expand functionality of the electronic device, and convenience to the user by seamlessly integrating the new function.

Figure 5B:
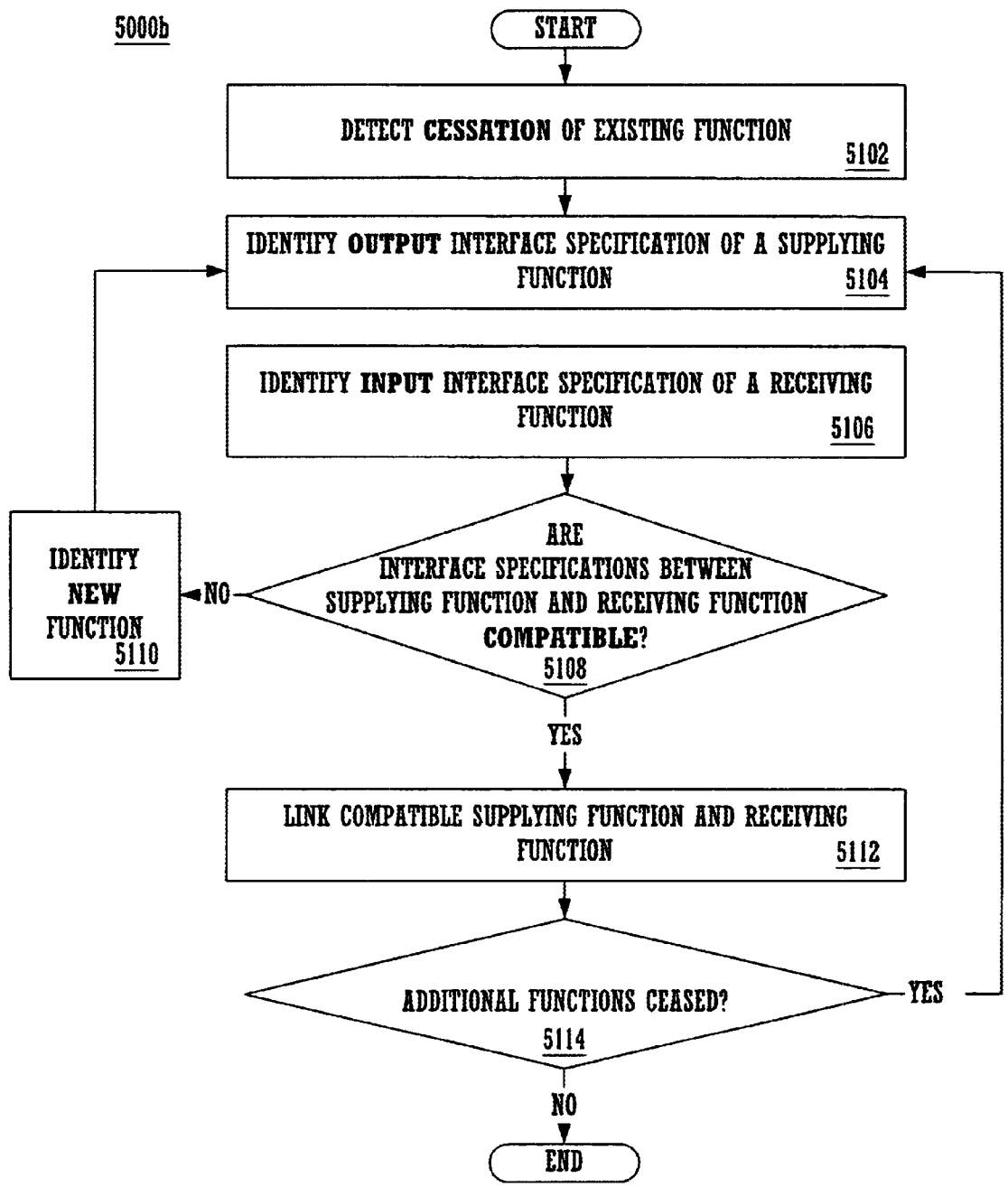
FIG. 5B is a flowchart of a process to dynamically accommodate the cessation of a function in a scaleable system architecture, in accordance with one embodiment of the present invention.

Referring now to FIG. 5B, a flowchart 5000b of a process to dynamically accommodate the cessation of a function in a scaleable system architecture is shown, in accordance with one embodiment of the present invention. Flowchart 5000b essentially provides the complementary case of that provided in flowchart 5000a by providing a method of fixing the system when a function is dynamically removed form the system. Because of the complementary nature of flowchart 5000a and 5000b, many of the examples and alternatives provided in flowchart 5000a are applicable to 5000b. By using the flowchart 5000b embodiment, the present invention provides flexibility to automatically and dynamically accommodate different device configurations, different module capabilities, and different functions in a seamless manner. It is not necessary for flowchart 5000a to precede flowchart 5000b. That is, a function does not need to be dynamically installed in order to be dynamically removable form the system. Rather, a default function that always existed in the electronic device can be dynamically removed using flowchart 5000b.

Flowchart 5000b is implemented using the hardware described in FIG. 2A and the functional blocks of FIGS. 3A and 3B. However, the present invention is well suited to using any electronic device having a suitable processor and memory for accepting the instructions and data for performing the process. In one embodiment, flowchart 5000a accommodates the dynamic removal of a module from an operating computer system. By doing so, the present invention provides a method for dynamically accommodating the cessation of the existing function of the module in the host computer system without causing it to crash or lose data.

Flowchart 5000b begins with step 5102. In step 5102 of the present embodiment, the cessation of an existing function is detected. Step 5102 is implemented, in one embodiment, by computer system 201 detecting the removal of a module 220, shown in FIG. 2, which provided the function in question. The process of detecting a removal of a module can be implemented in a wide variety of methods such as detecting the cessation of a signal normally provided by the module and received by the processor of the host device. That is, the removal of a module can automatically provide an interrupt or a notification to the host device by its absence, thus indicating that an existing functional capability is no longer available for the system. If a module is dynamically unplugged from a computer system, the sequencing of data between functions may be altered. In short, ceasing a function creates a breach in the chain of data transfer between functions. Flowchart 5000b provides a solution to this breach. Following step 5102, flowchart 5000b proceeds to step 5104.

In step 5104 of the present embodiment, an output interface specification of a receiving function is identified. The supplying function is a remaining function that is located upstream of, e.g., that "supplied data" to, the ceased function. The supplying function can be adjacent to the ceased function, or if it is not compatible with the balance of the system, the supplying function can be removed from the ceased function by one or more functional steps. For example, if echo effect filter function 428 of FIG. 4B is ceased, due to the removal of a module containing the function, then the output interface, e.g., OIS 424b of upstream function, e.g. audio 5.1 demux function 424, is identified. Thus step 5104 identifies the data type and format of a function on one side of the breach in the chain of data transfer between functions. Following step 5104, flowchart 5000b proceeds to step 5106.

In step 5106, an input interface specification of a receiving function is identified. The receiving function is a remaining function that is located downstream of, e.g., that "received data" from, the ceased function. The receiving function can be adjacent to the ceased function, or if it is not compatible with the balance of the system, the receiving function can be removed from the ceased function by one or more functional steps. For example, if echo effect filter function 428 of FIG. 4B is ceased, due to the removal of a module containing the function, then the input interface specification (IIS), e.g., IIS 430a of upstream function, e.g. amplifier function 430, is identified. Thus step 5106 identifies the data type and format of a function on another side of the breach in the chain of data transfer between functions. Following step 5106, flowchart 5000b proceeds to step 5108.

In step 5108 of the present embodiment, an inquiry determines whether the interface specifications between the supplying function and the receiving function are compatible. If the interface specifications between the supplying function and the receiving function are compatible, then flowchart 5000b proceeds to step 5112. Conversely, if the interface specifications between the supplying function and the receiving function are not compatible, then flowchart 5000b proceeds to step 5110. Thus, step 5108 provides the logic to dynamically evaluate the two interfaces left open by the cessation of an existing function.

In step 5110 of the present embodiment, a new function is identified. Thus, for example, if OIS 424b of demux function 424 was found to be incompatible with IIS 430a of amplifier function 430, step 5110 would allow the search for an alternative function, e.g., a default filtering function (not shown) of the computer system that was previously replaced by the echo function. The new function could be either a supplying function or a receiving function, in relation to the ceased function. In another embodiment, flowchart 5000b could simply choose either the OIS of the supplying function or the IIS of the receiving function and then simply look for another function that has compatible interface specification. Following step 5110, flowchart 5000b returns to step 5104.

In step 5112 of the present embodiment, the compatible supplying function and receiving function are linked. Step 5112 is implemented, in one embodiment, by using function linking engine 302 of FIG. 3A with components of electronic device 200 of FIG. 2. Step 5112 effectively closes the gap left by the ceased function in the data transfer chain. For example, if OIS 424b of Audio 5.1 demux function 424 was found to be compatible with IIS 430a of amplifier function 430, then the two functions would be linked, and the data processing of the audio signal would proceed seamlessly. Thus, rather than crashing or locking like the conventional systems, the present invention finds a solution to accommodate the ceased function. Following step 5112, flowchart 5000b proceeds to step 5114.

In step 5114 of the present embodiment, an inquiry determines if additional functions have ceased. If additional functions have ceased, then flowchart 5000b returns to step 5104. However, if no additional functions have ceased, then flowchart 5000b ends.

In view of the steps provided by flowchart 5000b, the present invention provides a dynamic and scaleable architecture that can be modified to accommodate a ceased function. This provides compatibly with many diversified electronic devices, flexibility to reduce or maintain the functionality of the electronic device, and convenience to the user by seamlessly accommodating the ceased function.

Flowcharts 5000a and 5000b are applicable to real time tasks and to non-real time, or plesiochronous, tasks of a function. A real time task is one that is performed consistently at given time intervals. A plesiochronous task is analogous to a non-real time task, e.g. a task that does not require predictable or guaranteed activation in well-defined time intervals. The plesiochronous task does not require absolute synchronization between events in two systems, hence it can be queued without detrimental effects, until an opportunity to execute it arises.

Flowcharts 5000a and 5000b are applicable to individual devices, and to systems. Hence, flowcharts 5000a and 5000b can be implemented in electronic device 200 or in computer system 201 of FIG. 2. While flowcharts 5000a and 5000b of the present embodiment shows a specific sequence and quantity of steps, the present invention is suitable to alternative embodiments. For example, not all the steps provided for flowcharts 5000a and 5000b are required for the present invention, e.g., GUI interface step 5018 is optional. Furthermore, additional steps can be added to the steps presented in the present embodiment. Likewise, the sequence of the steps can be modified depending upon the application. While flowcharts 5000a and 5000b are shown as a single serial process, it can also be implemented as a continuous or parallel process.

Many of the instructions for the steps, and the data input and output from the steps of flowcharts 5000a and 5000b are implemented utilizing memory 210 or 208 and utilizing processor 208 and/or 220, as shown in FIG. 2. Memory storage 210 and 208 of the present embodiment can either be permanent, such as read only memory (ROM), or temporary memory such as random access memory (RAM). Memory 210 and 208 can also be any other type of memory storage, capable of containing program instructions, such as a hard drive, a CD ROM, or flash memory. Furthermore, processor 208 and/or 220a can either be a dedicated controller, a general purpose processor, a dedicated digital signal processing (DSP) processor, or a dynamically configurable processor such as the TransMeta Crusoe chip. Alternatively, the instructions can be implemented using some form of a state machine.

In view of the embodiments described herein, the present invention provides a method and apparatus for providing and enabling a computer system architecture that is dynamic and scaleable. The embodiments described herein also indicate how the present invention overcomes the limitations of the conventional rigid and static system architectures in the conventional electronic devices and the limitations of the predetermined system requirements and the failure modes associated with conventional functional expansion cards. Finally, the embodiments described herein illustrate how the present invention overcomes the installation limitations of the conventional expansion card.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electronic device for data processing, said electronic device comprising:
   a processor; and
   a computer readable memory coupled to said processor and containing program instructions stored therein that when executed implement a method for enabling a dynamic and scaleable system architecture, said method comprising the steps of:
   a) detecting dynamic insertion of an electronic module comprising a second processor and a second computer readable memory;
   b) detecting the availability of a new function associated with said electronic module;
   c) receiving an input interface specification for said new function;
   d) receiving an output interface specification for said new function;
   e) determining if a first available function has an output interface specification that is compatible with said input interface specification for said new function;
   f) determining if a second available function has an input interface specification that is compatible with said output interface specification for said new function;
   g) selectively enabling said new function to receive data from said first available function and to supply data to said second available function if results from steps e) and f) are acceptable: and
   h) dynamically instantiating said new function if a performance criteria for said electronic device is satiated.

2. The electronic device recited in claim 1 further comprising:
   an adapter for receiving a module that will add functionality to said electronic device.

3. The electronic device recited in claim 1 wherein said method further comprises the steps of:
   i) providing a graphical user interface (GUI) indicating that said new function can be enabled; and
   j) receiving input from said GUI as to whether said new function should be enabled.

4. The electronic device recited in claim 1 wherein said input interface specification and said output interface specification provides information regarding a type of data and a format of data for said function.

5. The electronic device recited in claim 4 wherein said information, provided in said input interface specification and said output interface specification, is formatted in a descriptive language.

6. The electronic device recited in claim 5 wherein said descriptive language is Extensible Markup Language (XML).

7. The electronic device recited in claim 1 wherein said method further comprises the steps of;
   i) detecting the cessation of a previously existing function;
   j) identifying an output interface specification of a supplying function that supplied data to said previously existing function;
   k) identifying an input interface specification of a receiving function that received data from said previously existing function;
   l) determining whether said output interface specification of said supplying function and said input interface specification of said receiving function are compatible; and
   m) said supplying function and said receiving function If results from step I) are acceptable.

8. A computer system for processing functions, said computer system comprising:
   multiple processing components; and
   a computer readable memory coupled to said multiple processing components and containing program instructions stored therein that when executed implement a method for enabling a dynamic and scaleable system architecture, said method comprising the steps of:
   a) detecting dynamic insertion of an electronic module comprising a second processor and a second computer readable memory;
   b) detecting the availability of a new function associated with said electronic module;
   c) receiving an input interface specification for said new function;
   d) receiving an output interface specification for said new function;
   e) determining if a first available function has an output interface specification that is compatible with said input interface specification for said new function;
   f) determining if a second available function has an input interface specification that is compatible with said output interface specification for said new function; and
   g) selectively enabling said new function to receive data from said first available function and to supply data to said second available function if results from steps e) and f) are acceptable; and h) dynamically instantiating said new function if a performance criteria for said computer system is satiated.

9. The computer system recited in claim 8 further comprising:

an adapter for receiving a module that will add functionality to said computer system.

10. The computer system recited in claim 8 wherein said method further comprises the steps of:

i) providing a graphical user interface (GUI) indicating that said new function can be enabled; and j) receiving input from said GUI as to whether said new function should be enabled.

11. The computer system recited in claim 8 wherein said input interface specification and said output interface specification provides information regarding a type of data and a format of data for said function.

12. The computer system recited in claim 11 wherein said information, provided in said input interface specification and said output interface specification, is formatted in a descriptive language.

13. The computer system recited in claim 12 wherein said descriptive language is Extensible Markup Language (XML).

14. The computer system recited in claim 8 wherein said method further comprises the steps of:

i) detecting the cessation of an existing function;

j) identifying an output interface specification of a supplying function that supplied data to said existing function;

k) identifying an input interface specification of a receiving function that received data from said existing function;

l) determining whether said output interface specification of said supplying function and said input interface specification of said receiving function are compatible; and m) linking said supplying function and said receiving function if results from step I) are acceptable.

15. A computer readable medium containing therein computer readable codes for causing a computer to implement a method for enabling a dynamic and scaleable system architecture, said method comprising the steps of:

a) detecting dynamic insertion of an electronic module comprising a second processor and a second computer readable memory;

b) detecting the availability of a new function associated with said electronic module;

c) receiving an input interface specification for said new function;

d) receiving an output interface specification for said new function;

e) determining if a first available function has an output Interface specification that is compatible with said input interface specification for said new function;

f) determining if a second available function has an input interface specification that is compatible with said output interface specification for said new function;

g) selectively enabling said new function to receive data from said first available function and to supply data to said second available function if results from steps e) and f) are acceptable; and h) dynamically instantiating said new function if a performance criteria for said computer is satiated.

16. The computer readable medium recited in claim 15 wherein said method further comprises the steps of:

i) providing a graphical user Interface (GUI) indicating that said new function can be enabled; and j) receiving input from said GUI as to whether said new function should be enabled.

17. The computer readable medium recited in claim 15 wherein said input interface specification and said output interface specification provides information regarding a type of data and a format of data for said function.

18. The computer readable medium recited in claim 15 wherein said method further comprises the steps of:

i) detecting the cessation of an existing function;

j) identifying an output interface specification of a supplying function that supplied data to said existing function;

j) indenting an input interface specification of a receiving function that received data from said existing function;

l) determining whether said output interface specification of said supplying function and said input interfacspecification on of said receiving function are compatible; and m) linking said supplying function and said receiving function if results from step l) are acceptable.

* * * * *